United States Patent [19]

Akase

[11] Patent Number: 5,284,117
[45] Date of Patent: Feb. 8, 1994

[54] FUEL SUPPLY APPARATUS FOR AN INTERNAL COMBUSTION ENGINE

[75] Inventor: Yoshiaki Akase, Himeji, Japan

[73] Assignee: Mitsubishi Denki Kabushiki Kaisha, Tokyo, Japan

[21] Appl. No.: 51,544

[22] Filed: Apr. 26, 1993

[30] Foreign Application Priority Data

| Apr. 27, 1992 | [JP] | Japan | 4-107581 |
| Jun. 18, 1992 | [JP] | Japan | 4-159264 |
| Jun. 30, 1992 | [JP] | Japan | 4-172834 |

[51] Int. Cl.$^5$ .................. F02D 41/06; F02D 41/32; F02M 31/135
[52] U.S. Cl. .................. 123/445; 123/478; 123/491; 123/549
[58] Field of Search .......... 123/179.7, 179.15, 179.16, 123/179.21, 445, 472, 478, 480, 491, 492, 543, 549

[56] References Cited

U.S. PATENT DOCUMENTS

| 4,167,158 | 9/1979 | Martin et al. | 123/478 X |
| 4,231,333 | 11/1980 | Thatcher et al. | 123/478 X |
| 4,825,834 | 5/1989 | Toshimitsu et al. | 123/491 X |
| 4,829,966 | 5/1989 | D'Angelo et al. | 123/478 |
| 4,886,026 | 12/1989 | Cook | 123/478 |
| 4,892,076 | 1/1990 | Toshimits et al. | 123/491 X |
| 4,967,706 | 11/1990 | Van Wechem et al. | 123/549 X |
| 5,119,775 | 6/1992 | Kokubo et al. | 123/179.16 |
| 5,140,967 | 8/1992 | Scherenberg et al. | 123/549 |
| 5,168,839 | 12/1992 | Hitomi et al. | 123/445 X |
| 5,172,673 | 12/1992 | Pelgrim et al. | 123/549 |
| 5,213,082 | 5/1993 | Abe et al. | 123/491 |

FOREIGN PATENT DOCUMENTS

| 48773 | 3/1983 | Japan . |
| 23364 | 1/1991 | Japan . |

*Primary Examiner*—Willis R. Wolfe
*Attorney, Agent, or Firm*—Sughrue, Mion, Zinn, Macpeak & Seas

[57] ABSTRACT

A fuel supply apparatus for an internal combustion engine includes a first fuel injector provided for each cylinder of the engine for injecting fuel into an intake pipe of the engine. A second fuel injector is disposed at a location upstream of the first fuel injector for injecting fuel into the intake pipe independently of the first fuel injector. A heater in the form of an electric heating plate is disposed on the inner surface of the intake pipe at a location between the first and second fuel injectors for heating and evaporating the fuel injected from the second fuel injector.

10 Claims, 5 Drawing Sheets

FUEL SUPPLY APPARATUS FOR AN INTERNAL COMBUSTION ENGINE

BACKGROUND OF THE INVENTION

The present invention relates to a fuel supply apparatus for an internal combustion engine, and more particularly, it relates to a fuel supply apparatus of the type in which a fuel injector operates to inject fuel toward a heater provided in an intake pipe of the engine.

FIG. 5 schematically shows the general arrangement of a known fuel supply apparatus for an internal combustion engine. In this figure, the illustrated internal combustion engine includes an engine proper 1 having a plurality of cylinders (only one is illustrated) and a corresponding number of pistons reciprocating therein. An intake pipe 2 is connected with the engine proper 1 for supplying an air/fuel mixture thereto. A control valve 3 is disposed in the intake pipe 2 for controlling the amount or flow rate of intake air supplied to the engine proper 1. A fuel injector 4 is disposed in the intake pipe 2 at a location upstream of the control valve 3 for injecting a proper or required amount of fuel into the intake pipe 2. A heater 5 is disposed in the intake pipe 2 at a location downstream of the control valve 3 for heating fuel, which is injected from the fuel injector 4 into the intake pipe 2, and for expediting evaporation thereof. The heater 5 in the form of an electric heating rod is fixedly attached at its opposite ends to the inner surface of the intake pipe 2 through a pair of holders or brackets 6.

In operation, the fuel injector 4 is controlled by an unillustrated control means to inject a proper amount of fuel into the intake pipe 2 in accordance with the opening degree of the control valve 3 which is determined by an operating condition of the engine. The injected fuel is mixed with intake air in the intake pipe 2 and sucked together into the engine proper 1 via the intake pipe 2, while being heated by the heater 5 to expedite evaporation thereof. The thus evaporated air/fuel mixture is supplied into respective cylinders of the engine proper 1 and combusted therein. In this manner, fuel evaporation due to the heater 5 serves to atomize the injected fuel into finer particles to increase combustion efficiency in comparison with the use of a general type of fuel injector without any heater which is disposed near an intake valve provided in an intake port in each cylinder head for controlling fuel supply to a corresponding cylinder.

However, the above-mentioned known fuel supply apparatus involves the following disadvantages. In the known fuel supply apparatus, the heater 5 is disposed in a perpendicular relation with respect to air streams in the intake pipe 2 so that it somewhat presents an obstacle to the air streams, thus causing a pressure loss of the intake air. This may result in adverse effects during intake strokes of the engine.

Japanese Patent Laid-Open No. 58-48773 discloses another example in which a heater is disposed on and near the wall of an intake pipe. In this prior art, too, a fuel injector injects fuel toward the heater, so during a high load engine operation, for example, in which a relatively great amount of fuel is injected from the injector, the injected fuel is heated to be atomized by the heater before introduction into respective engine cylinders. As a consequence, a lot of energy is consumed by the heater for heating and atomizing such a great amount of fuel, resulting in an impairment or reduction in fuel economy.

SUMMARY OF THE INVENTION

Accordingly, the present invention is intended to overcome the above-described problems encountered with the known fuel supply apparatuses.

An object of the present invention is to provide a novel and improved fuel supply apparatus for an internal combustion engine which employs a plurality of fuel injectors, at least one for injecting fuel toward a heater in an intake pipe to basically expedite atomization of the injected fuel, the other being disposed downstream of the at least one injector for supplying a further or additional amount of fuel to each cylinder only when a greater amount of fuel is required such as when a highly loaded operation, acceleration, etc.

Another object of the invention is to provide a novel and improved fuel supply apparatus for an internal combustion engine which does not need any excessive power supply to the heater for power saving, and which can still supply a sufficient amount of fuel to respective cylinders as required.

In order to achieve the above objects, according to one apsect of the present invention, there is provided a fuel supply apparatus for an internal combustion engine which comprises: a first fuel injector provided for each cylinder of the engine for injecting fuel into an intake pipe of the engine; a second fuel injector disposed at a location upstream of the first fuel injector for injecting fuel into the intake pipe independently of the first fuel injector; and a heater disposed on the inner surface of the intake pipe at a location between the first and second fuel injectors for heating and evaporating the fuel injected from the second fuel injector.

In one form of the invention, the fuel supply apparatus further comprises: sensor means for sensing an operating condition of the engine and generating a corresponding output signal; and control means connected to receive the output signal from the sensor means for controlling the first and second fuel injectors in such a manner that the ratio of a first fuel amount injected from the first fuel injector to a second fuel amount injected from the second fuel injector varies in accordance with the operating condition of the engine.

In another form of the invention, the fuel supply apparatus further comprises: a temperature sensor for sensing the temperature of the engine and generating a corresponding output signal; control means connected to receive the output signal from the temperature sensor for controlling the first and second fuel injectors and the heater in such a manner that it stops the fuel injection of the second fuel injector and the heater while allowing the first fuel injector to continue injecting fuel when the engine temperature is higher than a predetermined value.

In a further form of the invention, the fuel supply apparatus further comprises: a temperature sensor for sensing the temperature of the engine and generating a corresponding output signal; and control means connected to receive the output signal from the temperature sensor for controlling the first and second fuel injectors and the heater in such a manner that when the engine temperature is lower than a predetermined value such as during engine warming-up operation, the first fuel injector injects a first amount of fuel which is equal to a normal amount of fuel required for a normal engine start-up operation in which the engine temperature is higher than the predetermined value, and the second fuel injector operates to inject an additional amount of fuel which is additional to the normal amount of fuel, the control means being further operable to stop the fuel injection of the second fuel injector and the heater while allowing the fuel injection of the first fuel injector to continue when the engine temperature rises above the predetermined value.

According to another aspect of the invention, there is provided a fuel supply apparatus for an internal combustion engine having a plurality of groups of cylinders. The fuel supply apparatus comprises: a plurality of first fuel injectors provided one for each of the cylinders for injecting fuel into an intake pipe of the engine connected with the cylinders; a plurality of second fuel injectors provided one for each group of the cylinders and disposed each at a location upstream of a corresponding group of first fuel injectors for injecting fuel into the intake pipe independently of the first fuel injectors; and a plurality of heaters provided one for each second fuel injector and each disposed on the inner surface of the intake pipe at a location between a corresponding second fuel injector and a corresponding group of first fuel injectors for heating and evaporating the fuel injected from the corresponding second fuel injector.

According to a further aspect of the invention, there is provided a fuel supply apparatus for an internal combustion engine having a plurality of cylinders. The fuel supply apparatus comprises: a plurality of first fuel injectors provided one for each of the cylinders for injecting fuel into an intake pipe of the engine connected with the cylinders; a plurality of second fuel injectors provided one for each of the cylinders and each disposed at a location upstream of a corresponding first fuel injector for injecting fuel into the intake pipe independently of the first fuel injectors; and a plurality of heaters provided one for each second fuel injector and each disposed on the inner surface of the intake pipe at a location between a corresponding second fuel injector and a corresponding first fuel injector for heating and evaporating the fuel injected from the corresponding second fuel injector.

The above and other objects, features and advantages of the invention will now become more apparent from the ensuing detailed description of a few embodiments of the invention taken in conjunction with the accompanying drawings.

DESCRIPTION OF PREFERRED EMBODIMENTS

Preferred embodiments of the present invention will now be described in detail while referring to the accompanying drawings.

EMBODIMENT 1

Figure 1:
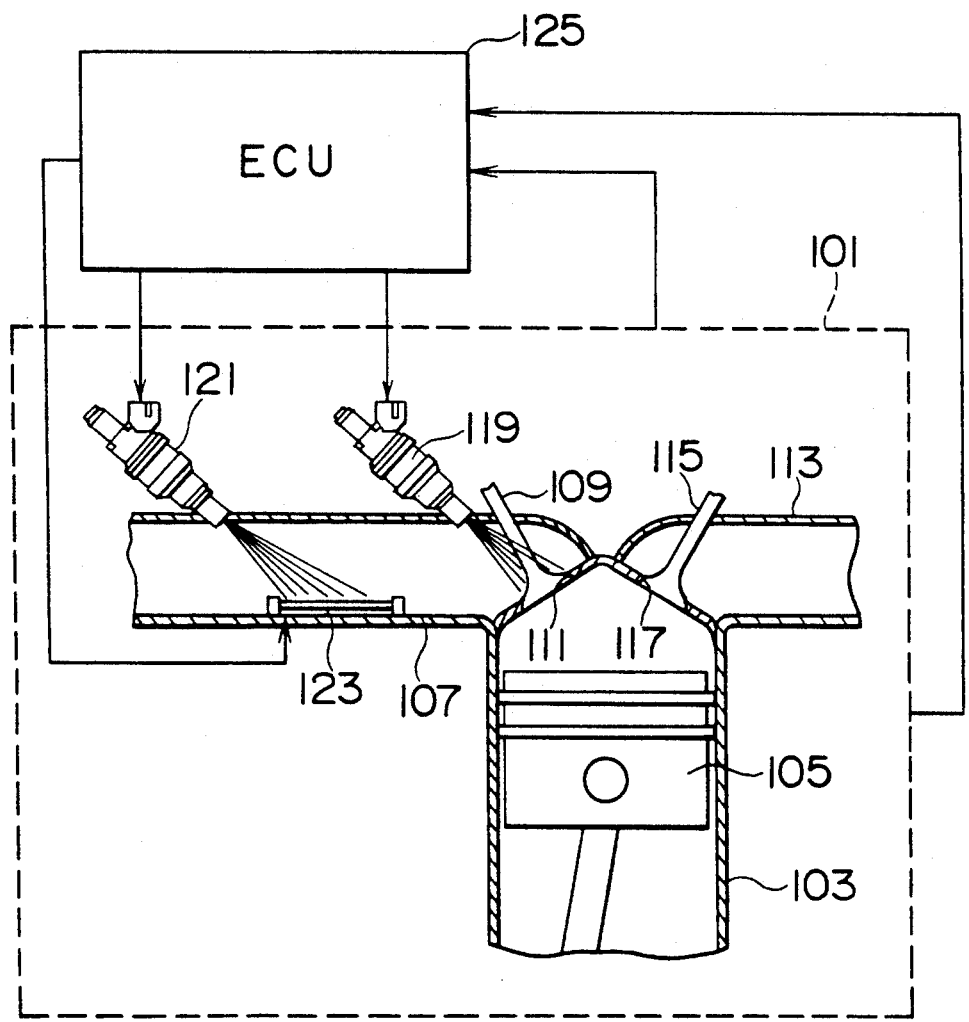
FIG. 1 is a schematic cross sectional view showing the general arrangement of a fuel supply apparatus for an internal combustion engine in accordance with the present invention.

FIG. 1 schematically illustrates a fuel supply apparatus for an internal combustion engine constructed in accordance with a first embodiment of the present invention. In this figure, an illustrated internal combustion engine 101 includes a plurality of cylinders 103 (only one is illustrated) and a corresponding number of pistons 105 reciprocating therein. An intake pipe or manifold 107 is connected at one end thereof with the respective cylinders 103 for supplying intake air thereto. An intake valve 109 is provided for opening and closing an intake port 111 which is formed in a cylinder head of each cylinder 103. An exhaust pipe or manifold 113 is also connected at one end thereof with the respective cylinders 103 for discharging combusted or exhaust gases form the respective cylinders to the ambient atmosphere. An exhaust valve 115 is provided for opening and closing an exhaust port 117 which is formed in the cylinder head of each cylinder 103.

The internal combustion engine 101 is equipped with the fuel supply apparatus of this embodiment which is of the multi-point injection type including a plurality of fuel injectors. Specifically, a first fuel injector 119 is disposed near each intake valve 109 for supplying fuel into a corresponding cylinder 103 through a corresponding intake port 111. A second fuel injector 121 is disposed at a location upstream of the first fuel injector 119 and downstream of an unillustrated throttle valve for supplying fuel into the intake pipe 107. A heater 123 is disposed near, and mounted on, the inner surface of the intake pipe 107 at a location near and slightly downstream of the second fuel injector 121 for heating and evaporating fuel injected therefrom. The heater 123 takes the form of an electric heating plate which extends along the inner surface of the intake pipe 107 and against which the direction of injection of the second fuel injector 121 is oriented.

An electronic control unit 125 (hereinafter simply referred to as an ECU) in the form of a microcomputer receives engine operating condition signals representative of the engine temperature, the engine rotational speed (i.e., the number of revolutions per minute of the engine), the amount of intake air supplied to each cylinder and the like, from a variety of unillustrated sensors, calculates an amount of fuel to be injected from each of the first and second fuel injectors 119, 121 and controls the injectors 119, 121 so that the amount of fuel thus calculated is injected therefrom into the intake pipe 107.

The operation of this embodiment will now be described in detail below. The ECU 125 first calculates a proper amount of fuel in accordance with the operating condition of the engine 101. A portion of the fuel thus calculated, which is determined based mainly on the engine temperature, the engine rotational speed and the intake air amount, is injected from the second fuel injector 121 toward the electric heating plate 123 in the intake pipe 107. The fuel injected from the second fuel injector 121 is heated and reflected by the electric heating plate 123 to expedite evaporation thereof. A major portion of the injected fuel is thus atomized by the electric heating plate 123, and a remaining portion thereof is reflected by the inner surface of the intake pipe 107 near the heating plate 123, and then introduced into the respective cylinders 103 via the intake pipe or manifold 107.

In this connection, it is to be noted that the second fuel injector 121 and the heating plate 123 are arranged such that fuel injected from the second fuel injector 121 is effectively reflected by the heating plate 123 to smoothly flow into the respective cylinders 103.

On the other hand, the remaining portion of the fuel calculated by the ECU 125, which is equal to the total amount of fuel minus the amount of fuel injected from the second fuel injector 121, is injected from each first fuel injector 119.

The fuel injected from the second fuel injector 121 and evaporated by the heating plate 123 is sucked, together with intake air in the intake pipe 107 and the fuel injected from the first fuel injectors 119, into the respective cylinders 103 via the respective intake ports 111, compressed there by the respective pistons 105, combusted to explode, and exhausted through the exhaust pipe 113 into the ambient atmosphere.

Figure 5:
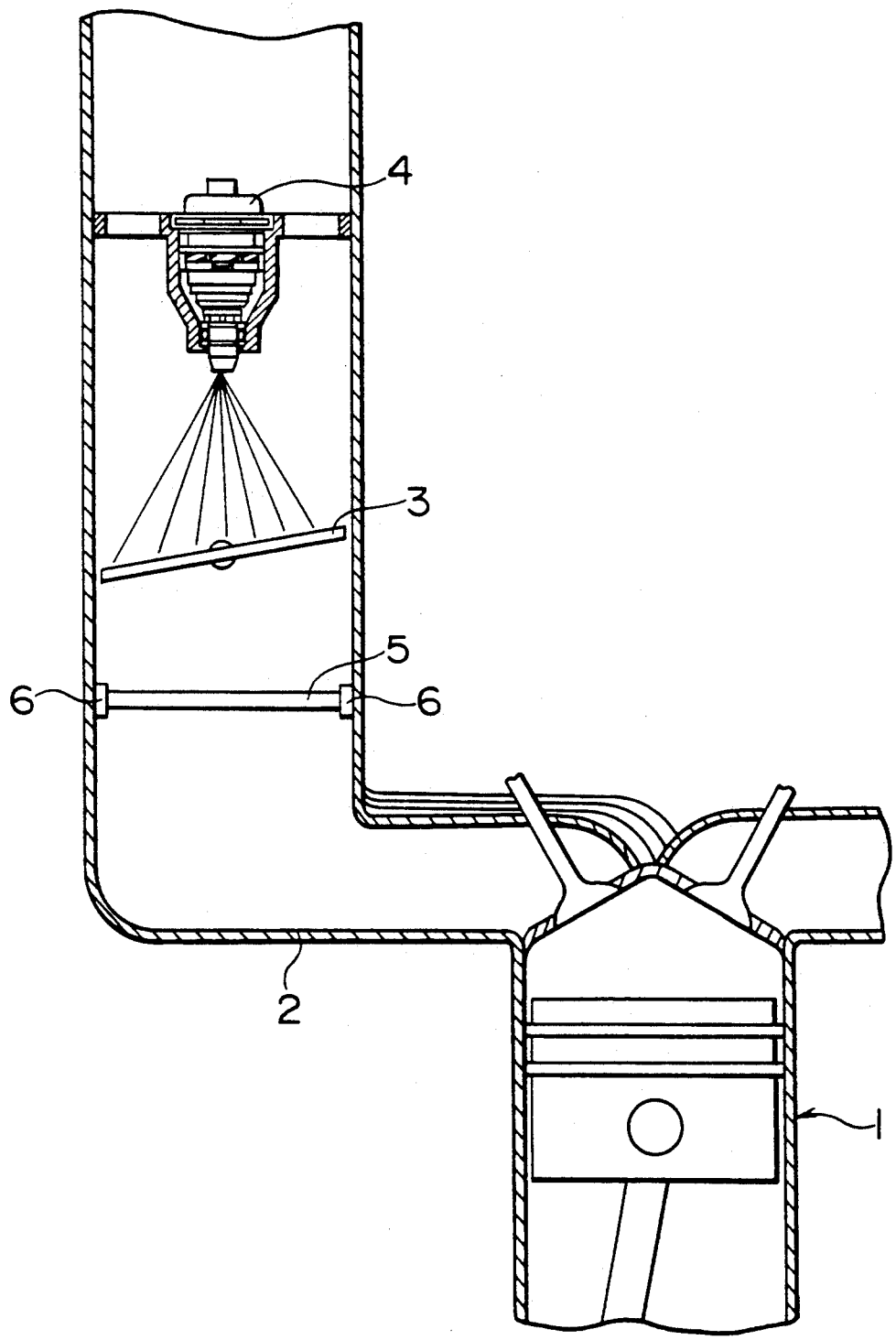
FIG. 5 is a schematic cross sectional view showing the general arrangement of a known fuel supply apparatus for an internal combustion engine.

As described above, the disposition of the heating plate 123 near or on the inner surface of the intake pipe 107 serves to reduce a pressure loss of intake air flowing in the intake pipe 107 as compared with the electric heating rod 5 of the previously described known apparatus of FIG. 5, thereby ensuring a high output power of the engine 101 under the high load operation thereof. In addition, since the second fuel injector 119 supplies a portion of fuel to the intake pipe 107 and each first fuel injector 121 supplies the remaining or additional portion of fuel to the intake pipe 107, the ratio of the fuel amount injected by the second injector 121 to the fuel amount injected by the first injector 119 can be properly adjusted to optimize the amount of fuel to be injected from the second injector 119 so that the injected fuel amount is suitable for efficient atomization by the heating plate 123. As a result, evaporation of fuel by the electric heating plate 123 can be improved.

EMBODIMENT 2

Figure 2:
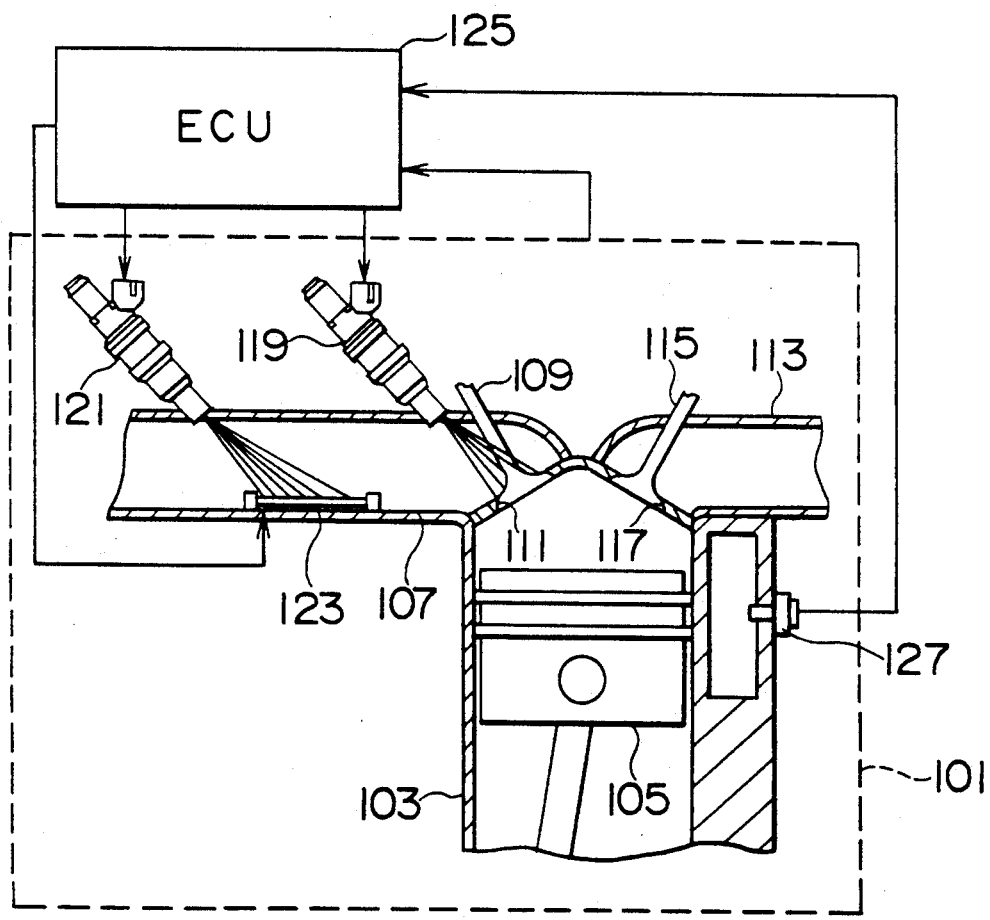
FIG. 2 is a view similar to FIG. 1, but showing another embodiment of the invention.

FIG. 2 shows a second embodiment of the invention which is substantially similar to the previous embodiment of FIG. 1 except for the following feature. In this embodiment, a temperature sensor 127 is mounted on a cylinder 103 of the engine 101 for sensing the temperature of an engine coolant or cooling water representative of the engine temperature and generating a corresponding signal which is fed to the ECU 125.

The operation of the second embodiment will be described below. According one aspect of this embodiment, when the engine temperature as sensed by the temperature sensor 127 is higher than a predetermined value during a high load operation of the engine 101 (i.e., when the engine load is greater than a predetermined value), the power supply to the electric heating plate 123 is cut off by the ECU 125 and at the same time the operation of the second fuel injector 121 is stopped to interrupt fuel injection thereof. As a result, fuel is supplied from the first fuel injectors 119 alone to the intake pipe 107 and hence to the cylinders 103 via the respective intake ports 111. This serves to reduce power consumption of the heating plate 123.

According to another aspect of this embodiment, when the engine 101 is being warmed up, the air/fuel ratio of an air/fuel mixture supplied to the engine cylinders 103 is often adjusted to be richer than the stoichiometric air/fuel ratio for expediting the engine warm-up operation. In this case, when the engine temperature as sensed by the temperature sensor 127 is lower than a predetermined warm-up temperature, the ECU 125 determines a temperature-based correction amount of fuel for engine warm-up on the basis of the engine temperature, and controls the second fuel injector 121 so that the second fuel injector 121 injects only the temperature-based correction amount of fuel thus determined toward the electric heating plate 123 which is supplied with electric power from an unillustrated power source in response to the start of fuel injection of the second injector 121 or the start of engine operation. Each first fuel injector 119 injects toward a corresponding intake valve 111 a basic amount of fuel for a normal engine warm-up operation which is basically required for warming up the engine 101 whose temperature is higher than the predetermined warm-up temperature.

After the engine 101 has been warmed up to a predetermined temperature (i.e., when the engine temperature has risen above a predetermined warm-up value), the power supply to the electric heating plate 123 is cut off and at the same time the operation of the second fuel injector 121 is stopped by the ECU 125. Each first fuel injector 119 still continues to perform fuel injection. In this manner, power consumption of the heating plate 123 is minimized as compared with the case in which power is continuously supplied to the heating plates 123 throughout the entire engine operation, while allowing the heating plates 123 to exert sufficient fuel evaporation efficiency during engine warm-up periods.

The operation of this embodiment other than the above is substantially the same as that of the FIG. 1 embodiment.

Although in the above-mentioned first and second embodiments, a single second fuel injector 121 is used, a plurality of second fuel injectors can be employed as required with substantially the same effects.

EMBODIMENT 3

Figure 3:
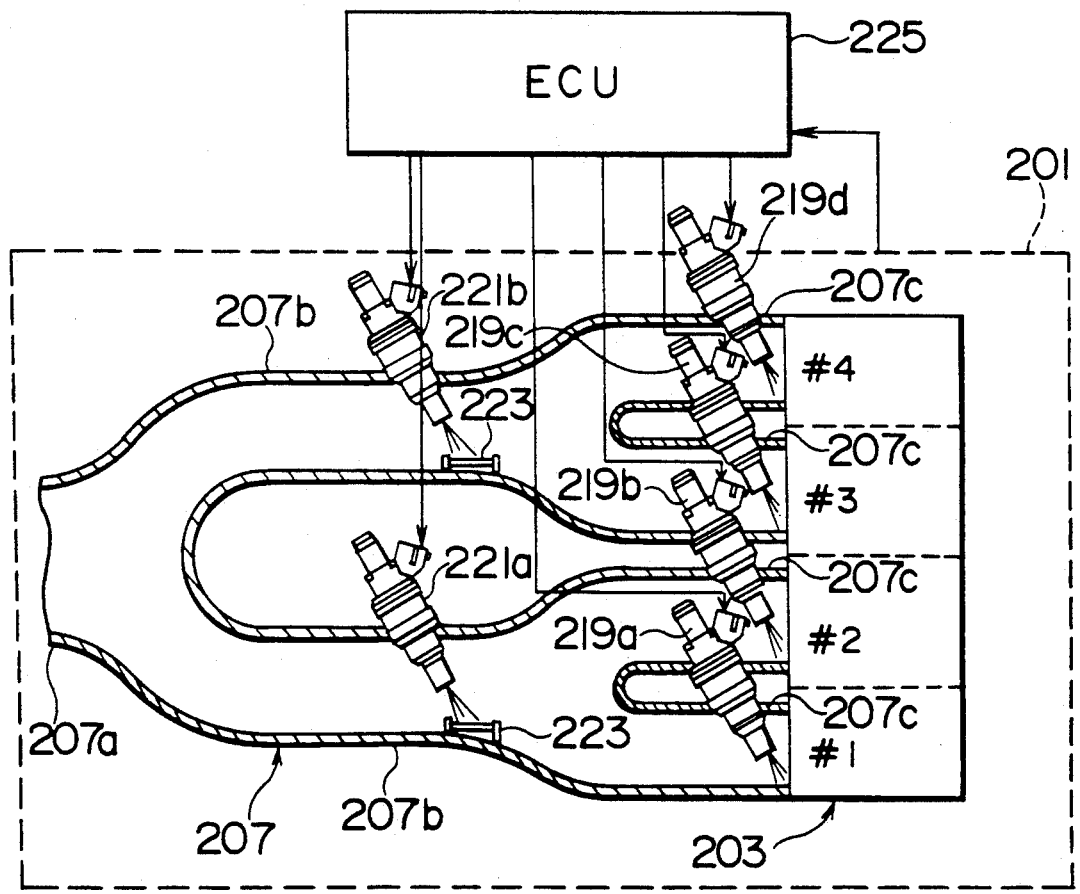
FIG. 3 is a schematic illustration showing the general arrangement of a fuel supply apparatus for an internal combustion engine in accordance with a further embodiment of the invention.

FIG. 3 shows a third embodiment of the present invention. In this embodiment, an internal combustion engine 201 has a plurality of (e.g., four) in-line cylinders 203. An intake pipe or manifold 207 has a single main passage 207a, a plurality of (e.g., two, first and second) main-branch passages 207b branching from the main passage 207a, and a plurality of (e.g., two, first and second) groups of sub-branch passages 207c. The first group of sub-branch passages 207c branch at one end thereof from the first main-branch passage 207b and are connected at the other end thereof with cylinders #1, #2, respectively. The second group of sub-branch passages 207c branch from the second main-branch passage 207b and are connected at the other end thereof with cylinders #3, #4, respectively. A plurality of first fuel injectors 219a–219b are provided one for each cylinder 203 with their one end disposed near and directed toward corresponding intake valves (not shown), as in the FIG. 1 embodiment. A plurality of second fuel injectors 221a, 221b are provided one for each main-branch passage 207b. Each of the second fuel injectors 221a, 221b is disposed at a location near a branching or merging portion of the corresponding sub-branch passages 207c with one end thereof directed toward a corresponding electric heating plate 223a or 223b which is mounted on and extend along the inner surface of a corresponding main-branch passage 207b.

Similar to the FIG. 1 embodiment, an electronic control unit 225 in the form of a microcomputer receives engine operating condition signals representative of the engine temperature, the engine rotational speed (i.e., the number of revolutions per minute of the engine), the amount of intake air supplied to each cylinder and the like, from a variety of unillustrated sensors, calculates an amount of fuel to be injected from each of the first and second fuel injectors 219a-219d, 221a-221b and controls these injectors so that the amount of fuel thus calculated is injected therefrom into the intake pipe 207.

Figure 4:
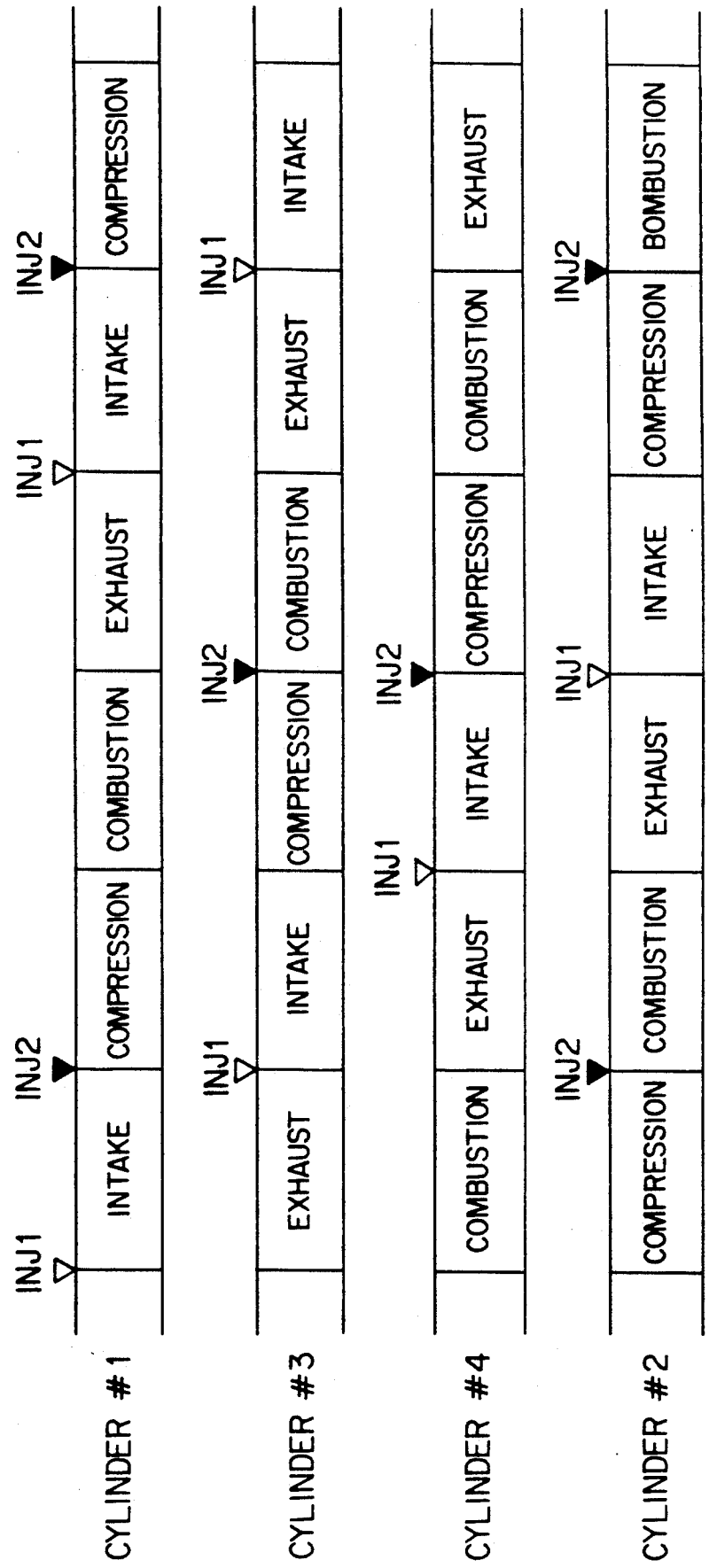
FIG. 4 is a timing chart showing fuel injection timing with the FIG. 3 embodiment.

The operation of this embodiment is substantially similar to that of the FIG. 1 embodiment except for the fact that fuel injection timings for the respective fuel injectors 219a-219d, 221a-221b are different from each other. Specifically, as shown in FIG. 4, fuel injection timing for each of the second fuel injectors 221a, 221b should be set such that it takes place earlier than intake strokes of a corresponding group of cylinders #1, #2 or #3, #4. Accordingly, for grouped cylinders #1, #2 for example, the fuel injection timing of the corresponding second fuel injector 221a is preferably set such that it takes place at a point in time INJ2a just before a compression stroke of cylinder #1 and just before combustion stroke of cylinder #2. In view of combustion efficiency, it is not preferable that the fuel injection of the second fuel injector 221a takes place before an exhaust stroke of corresponding cylinders. The same is applicable to the fuel injection timing INJ2b of the second fuel injector 221b.

The fuel injections of the first fuel injectors 219a-219d are to supplement insufficient or additional amounts of fuel which are injected from the second fuel injectors 221a, 221b, so they are preferably set to take place at a point in time INJ1 which is just before an intake stroke of a corresponding cylinder.

In this manner, the first and second fuel injectors 219a-219d, 221a-221b are respectively controlled independently of each other.

According to this embodiment, the heating plates 223a, 223b are provided one for each group of cylinders #1, #2 and #3, #4, so the number of heating plates is considerably reduced as compared with the case in which a heating plate is provided for each cylinder, thus minimizing the overall manufacturing cost.

Instead of disposing the second fuel injectors 221a, 221b, a second fuel injector with an electric heating plate can be disposed in each of sub-branch passages 207a-207d at a location upstream of a corresponding first fuel injector. In this case, a major portion of fuel is injected from each second fuel injector and a remaining or additional portion of fuel is injected from each first fuel injector for supplementing a shortage of the fuel supplied from each second fuel injector. In this case, too, it is preferred that the fuel injection timing for each second fuel injector be set at a time point INJ2 such as just before the compression stroke or combustion stroke slightly earlier than the intake stroke. This serves to enhance fuel evaporation, thus reducing harmful, uncombusted ingredients or substances in exhaust gases discharged from the engine 201 to the ambient atmosphere during the steady-state operation of the engine 201.

What is claimed is:

1. A fuel supply apparatus for an internal combustion engine comprising:

a first fuel injector provided for each cylinder of said engine for injecting fuel into an intake pipe of said engine;

a second fuel injector disposed at a location upstream of said first fuel injector for injecting fuel into said intake pipe independently of said first fuel injector; and a heater disposed on the inner surface of said intake pipe at a location between said first and second fuel injectors for heating and evaporating the fuel injected from said second fuel injector.

2. A fuel supply apparatus according to claim 1, further comprising:

sensor means for sensing an operating condition of said engine and generating a corresponding output signal; and control means connected to receive the output signal from said sensor means for controlling said first and second fuel injectors in such a manner that the ratio of a first fuel amount injected from said first fuel injector to a second fuel amount injected from said second fuel injector varies in accordance with the operating condition of said engine.

3. A fuel supply apparatus according to claim 1, further comprising:

a temperature sensor for sensing the temperature of said engine and generating a corresponding output signal;

control means connected to receive the output signal from said temperature sensor for controlling said first and second fuel injectors and said heater in such a manner that it stops the fuel injection of said second fuel injector and said heater while allowing said first fuel injector to continue injecting fuel when the engine temperature is higher than a predetermined value.

4. A fuel supply apparatus according to claim 1, further comprising:

a temperature sensor for sensing the temperature of said engine and generating a corresponding output signal; and control means connected to receive the output signal from said temperature sensor for controlling said first and second fuel injectors and said heater in such a manner that when the engine temperature is lower than a predetermined value such as during engine warming-up operation, said first fuel injector injects a first amount of fuel which is equal to a normal amount of fuel required for a normal engine start-up operation in which the engine temperature is higher than the predetermined value, and said second fuel injector operates to inject an additional amount of fuel which is additional to said normal amount of fuel, said control means being further operable to stop the fuel injection of said second fuel injector and said heater while allowing the fuel injection of said first fuel injector to continue when the engine temperature rises above the predetermined value.

5. A fuel supply apparatus according to claim 1, wherein said first fuel injector is disposed near an intake valve which operates to open and close an intake port formed in a head of each cylinder.

6. A fuel supply apparatus according to claim 1, wherein said heater comprises an electric heating plate which is disposed near said second fuel injector and extends along the inner surface of said intake pipe so that said second fuel injector injects fuel in a direction toward said heating plate.

7. A fuel supply apparatus for an internal combustion engine having a plurality of groups of cylinders, said fuel supply apparatus comprising:
   a plurality of first fuel injectors provided one for each of said cylinders for injecting fuel into an intake pipe of said engine connected with said cylinders;
   a plurality of second fuel injectors provided one for each group of said cylinders and disposed each at a location upstream of a corresponding group of first fuel injectors for injecting fuel into said intake pipe independently of said first fuel injectors; and
   a plurality of heaters provided one for each second fuel injector and each disposed on the inner surface of said intake pipe at a location between a corresponding second fuel injector and a corresponding group of first fuel injectors for heating and evaporating the fuel injected from said corresponding second fuel injector.

8. A fuel supply apparatus according to claim 7, wherein the fuel injection timing of each first fuel injector is set at a point in time just before an intake stroke of a corresponding cylinder, and the fuel injection timing of each second fuel injector is set at a point in time just before a compression stroke or a combustion stroke of a corresponding group of cylinders.

9. A fuel supply apparatus for an internal combustion engine having a plurality of cylinders, said fuel supply apparatus comprising:
   a plurality of first fuel injectors provided one for each of said cylinders for injecting fuel into an intake pipe of said engine connected with said cylinders;
   a plurality of second fuel injectors provided one for each of said cylinders and each disposed at a location upstream of a corresponding first fuel injector for injecting fuel into said intake pipe independently of said first fuel injectors; and
   a plurality of heaters provided one for each second fuel injector and each disposed on the inner surface of said intake pipe at a location between a corresponding second fuel injector and a corresponding first fuel injector for heating and evaporating the fuel injected from said corresponding second fuel injector.

10. A fuel supply apparatus according to claim 9, wherein the fuel injection timing of each first fuel injector is set at a point in time just before an intake stroke of a corresponding cylinder, and the fuel injection timing of each second fuel injector is set at a point in time just before a compression stroke or a combustion stroke of a corresponding cylinder.

* * * * *